(12) United States Patent
Woo

(10) Patent No.: US 10,903,606 B2
(45) Date of Patent: Jan. 26, 2021

(54) ANTI-THEFT STRUCTURE FOR ELECTRONIC CONTROL UNIT

(71) Applicant: Hyundai Mobis Co., Ltd., Seoul (KR)

(72) Inventor: Myeong Nam Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/568,859

(22) Filed: Sep. 12, 2019

(65) Prior Publication Data

US 2020/0127415 A1 Apr. 23, 2020

(30) Foreign Application Priority Data

Oct. 23, 2018 (KR) ........................ 10-2018-0126871

(51) Int. Cl.
| | |
|---|---|
| *H01R 13/639* | (2006.01) |
| *H01R 13/631* | (2006.01) |
| *H01R 13/629* | (2006.01) |
| *B60R 16/023* | (2006.01) |
| *B60R 11/00* | (2006.01) |
| *B60R 25/40* | (2013.01) |

(52) U.S. Cl.
CPC ......... *H01R 13/639* (2013.01); *H01R 13/629* (2013.01); *H01R 13/62905* (2013.01); *H01R 13/62927* (2013.01); *H01R 13/62955* (2013.01); *H01R 13/631* (2013.01); *B60R 16/0231* (2013.01); *B60R 25/40* (2013.01); *B60R 2011/0096* (2013.01)

(58) Field of Classification Search
CPC . B60R 16/0231; B60R 16/0215; B60R 25/40; B60R 2011/0096; H01R 13/629; H01R 13/62905; H01R 13/62955; H01R 13/639
See application file for complete search history.

(56) References Cited

U.S. PATENT DOCUMENTS

| | | | | |
|---|---|---|---|---|
| 4,726,789 A | * | 2/1988 | Yaffe ...................... | B60K 37/04 439/567 |
| 4,759,424 A | * | 7/1988 | Rolleri ................... | B60R 11/00 180/287 |
| 4,878,853 A | * | 11/1989 | Yamade ............... | H01R 13/641 439/144 |
| 5,295,375 A | * | 3/1994 | Jonas .................... | B60R 25/066 180/332 |
| 5,441,421 A | * | 8/1995 | Ponticelli, Jr. ...... | B60R 11/0205 439/284 |

(Continued)

*Primary Examiner* — James Harvey
*Assistant Examiner* — Matthew T Dzierzynski
(74) *Attorney, Agent, or Firm* — H.C. Park & Associates, PLC

(57) ABSTRACT

An anti-theft structure for an electronic control unit which includes an electronic control unit including assembly brackets mounted on both sides thereof and connector mounting grooves formed in an upper portion thereof to be spaced apart from each other; connectors coupled to the connector mounting grooves, and including connector coupling portions therein; and a safety bracket including side coupling portions on both ends of the safety bracket, the side coupling portions being engaged with assembly brackets, and bracket coupling portions corresponding to the connector coupling portions and the bracket coupling portions being engaged with the connector coupling portions.

16 Claims, 9 Drawing Sheets

(56) References Cited

U.S. PATENT DOCUMENTS

| | | | | |
|---|---|---|---|---|
| 5,705,975 | A * | 1/1998 | Serino | B60R 25/1001 |
| | | | | 307/10.2 |
| 6,005,301 | A * | 12/1999 | Sova | B60R 25/04 |
| | | | | 180/287 |
| 6,171,142 | B1 * | 1/2001 | Wang | H01R 12/7029 |
| | | | | 439/567 |
| 6,741,166 | B1 * | 5/2004 | Sanchez | B60R 11/0205 |
| | | | | 292/323 |
| 7,874,393 | B2 * | 1/2011 | Ahmed | B60R 25/00 |
| | | | | 180/287 |
| 10,281,195 | B2 * | 5/2019 | Cakirca | F25D 23/067 |
| 10,431,931 | B2 * | 10/2019 | Pieknik | H01R 13/44 |
| 10,687,430 | B2 * | 6/2020 | Lajux | H02G 3/125 |
| 2010/0199468 | A1 * | 8/2010 | Matsui | B60R 11/00 |
| | | | | 24/457 |
| 2020/0028301 | A1 * | 1/2020 | Takata | H01R 13/639 |
| 2020/0094756 | A1 * | 3/2020 | Takai | B60R 25/00 |
| 2020/0153147 | A1 * | 5/2020 | Mamiya | H01R 13/506 |

* cited by examiner

ANTI-THEFT STRUCTURE FOR ELECTRONIC CONTROL UNIT

CROSS-REFERENCE TO RELATED APPLICATION

This application claims priority from the benefit of Korean Patent Application No. 2018-0126871, filed on Oct. 23, 2018, which is hereby incorporated by reference for all purposes as if set forth herein.

BACKGROUND

Field

The present invention relates to an anti-theft structure for an electronic control unit.

Discussion of the Background

In general, an Integrated Body Unit (IBU) is an electronic control unit (ECU) in which an integrated Body Control Module (BCM), a Smart Key System (SMK), and a Tire Pressure Monitoring System (TPMS) are integrated, and controls electronic equipment in a vehicle in an integrated manner by communicating with individual ECUs controlling wipers, headlamps, power sheets, etc.

Some functions of the BCM may be implemented only by a controller of the IBU but most functions of the BCM are implemented through controller area network (CAN) communication.

In addition, the IBU communicates mainly with ECUs connected to a Body CAN (BCAN), and functions thereof are operated by exchanging input/output signals with ECUs establishing chassis CAN (CCAN) communication or powertrain CAN (PCAN) communication.

An anti-theft structure for an electronic control unit is applied to the IBU to defend theft attempts made from outside using drills, chainsaws, iron bars, etc. for at least five minutes.

An anti-theft structure for an electronic control unit of the related art has a structure in which a safety bracket having a certain thickness and length and formed in a multi-bend shape is coupled to the upper and side surfaces of an IBU so as to prevent the IBU from being stolen.

However, the anti-theft structure for an electronic control unit of the related art has problems that mishandling and assembly errors may occur during coupling of the safety bracket and the IBU, and a start failure may occur and convenience functions may not be operable due to vibration or ambient changes after the coupling of the safety bracket and the IBU.

SUMMARY

To address the above problems, the present invention is directed to providing an anti-theft structure for an electronic control unit, in which a safety bracket is double-locked to connectors of an electronic control unit so as to prevent the separation of the connectors due to an external environment factor.

According to an aspect of the present invention, an anti-theft structure for an electronic control unit includes an electronic control unit including assembly brackets mounted on both sides thereof and connector mounting grooves formed in an upper portion thereof to be spaced apart from each other; connectors coupled to the connector mounting grooves and including connector coupling portions therein; and a safety bracket including side coupling portions on both ends of the safety bracket, the side coupling portions being engaged with assembly brackets, and bracket coupling portions corresponding to the connector coupling portions, the bracket coupling portions being engaged with the connector coupling portions.

The connector coupling portions may include coupling spaces therein. Connector guide protrusions may be formed in the coupling spaces in a vertical direction. Each of the bracket coupling portions may be inserted into one of the coupling spaces and include a bracket coupling groove in a side thereof, the bracket coupling groove being fit-engaged with the connector guide protrusions when the bracket coupling portion is inserted into the coupling space.

The connector coupling portions may include coupling spaces therein and connector guide protrusions at both inner sides of the coupling spaces. The bracket coupling portions may be inserted into the coupling spaces and include bracket coupling holes in both sides thereof, the bracket coupling holes being fit-engaged with the connector guide protrusions.

Here, the coupling space of the connector coupling portion may have a height corresponding to a thickness of the connector coupling portion The bracket coupling portion may be interference fitted to the connector coupling portion.

An end portion of the bracket coupling groove of the bracket coupling portion may be inclined or curved.

Side guide protrusions may be formed on both sides of the connector guide protrusion to support side surfaces of the bracket coupling portion.

A side cross-section of a lower support surface of the connector coupling portion may be bent to elastically support the bracket coupling portion after the interference-fitting of the bracket coupling portion.

A support groove may be formed in a bottom surface of the lower support surface to be supported in the electronic control unit with the connector mounting groove during the interference fitting of the bracket coupling portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE ILLUSTRATED EMBODIMENTS

Hereinafter, advantages and features of the present invention and manners of achieving them will become readily apparent with reference to descriptions of the following detailed embodiments when considered in conjunction with the accompanying drawings. However, the scope of the present invention is not limited to such embodiments, and the present invention may be embodied in various forms. The embodiments to be described below are embodiments provided only to complete the disclosure of the present invention and assist those skilled in the art in fully understanding the scope of the present invention. The present invention is defined only by the scope of the appended claims. Terms used herein are used to aid in the explanation and understanding of the present invention and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Hereinafter, exemplary embodiments of the present invention will be described in detail with reference to the accompanying drawings.

Figure 1:
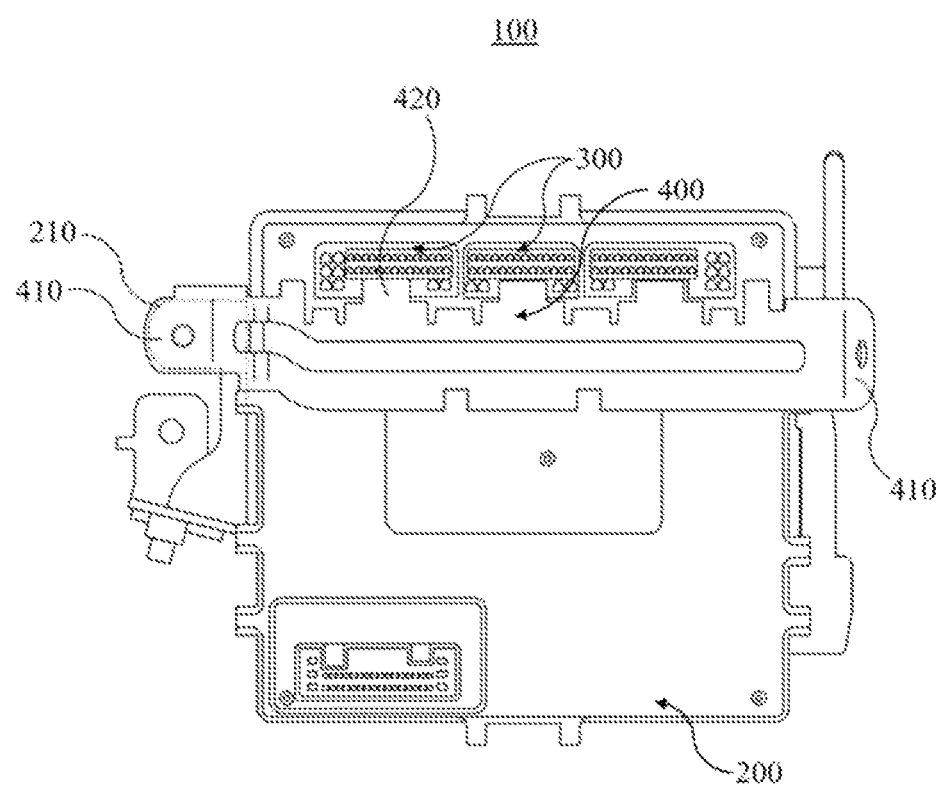
FIG. 1 is a plan view of an anti-theft structure for an electronic control unit according to an embodiment of the present invention.
Figure 2:
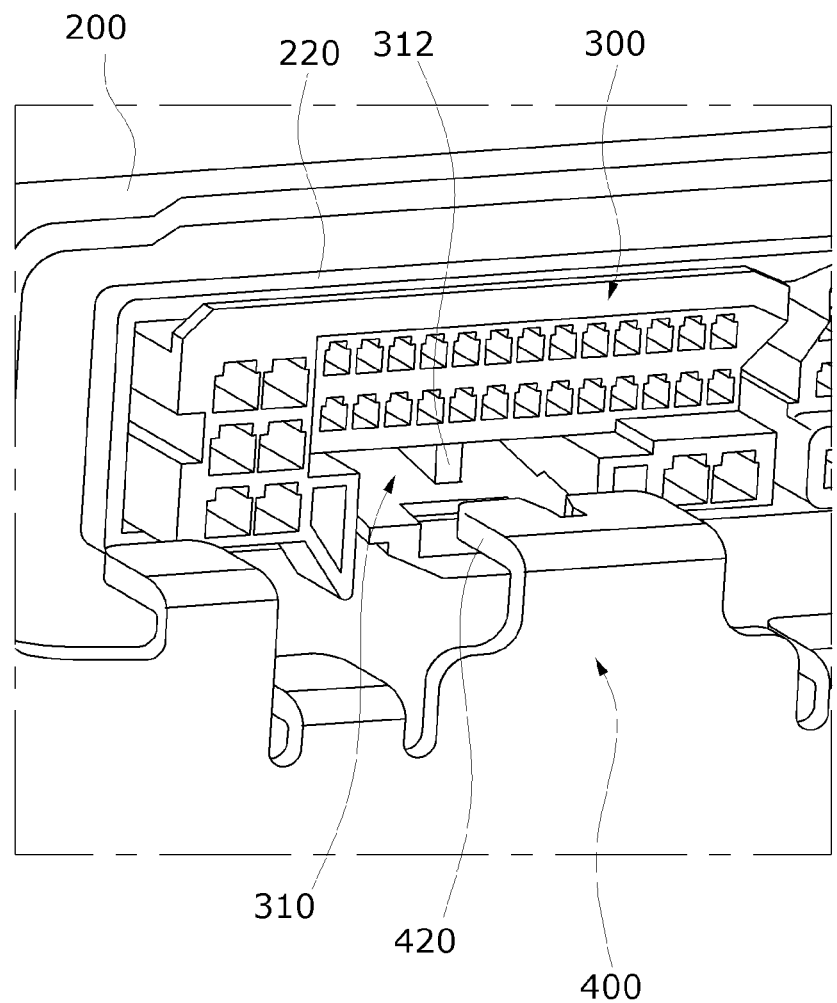
FIG. 2 is a view illustrating a state in which connectors and a safety bracket of an anti-theft structure for an electronic control unit according to an embodiment of the present invention are not coupled to each other.
Figure 3:
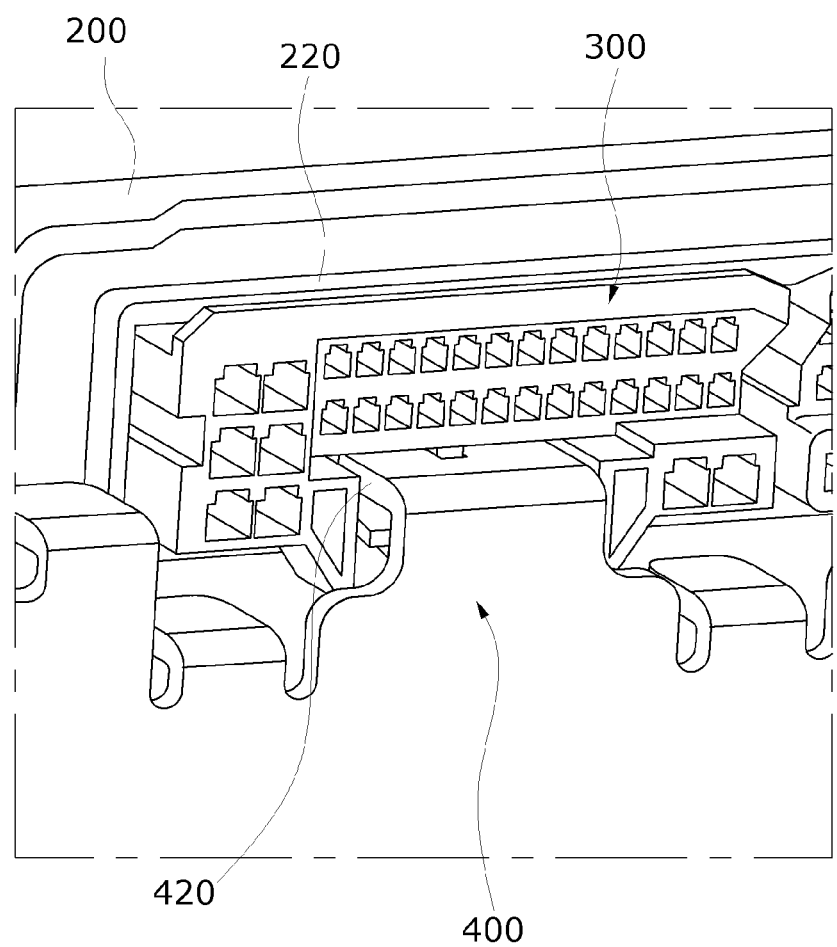
FIG. 3 is a view illustrating a state in which the connectors and the safety bracket of the anti-theft structure for an electronic control unit according to the embodiment of the present invention are coupled to each other.
Figure 4:
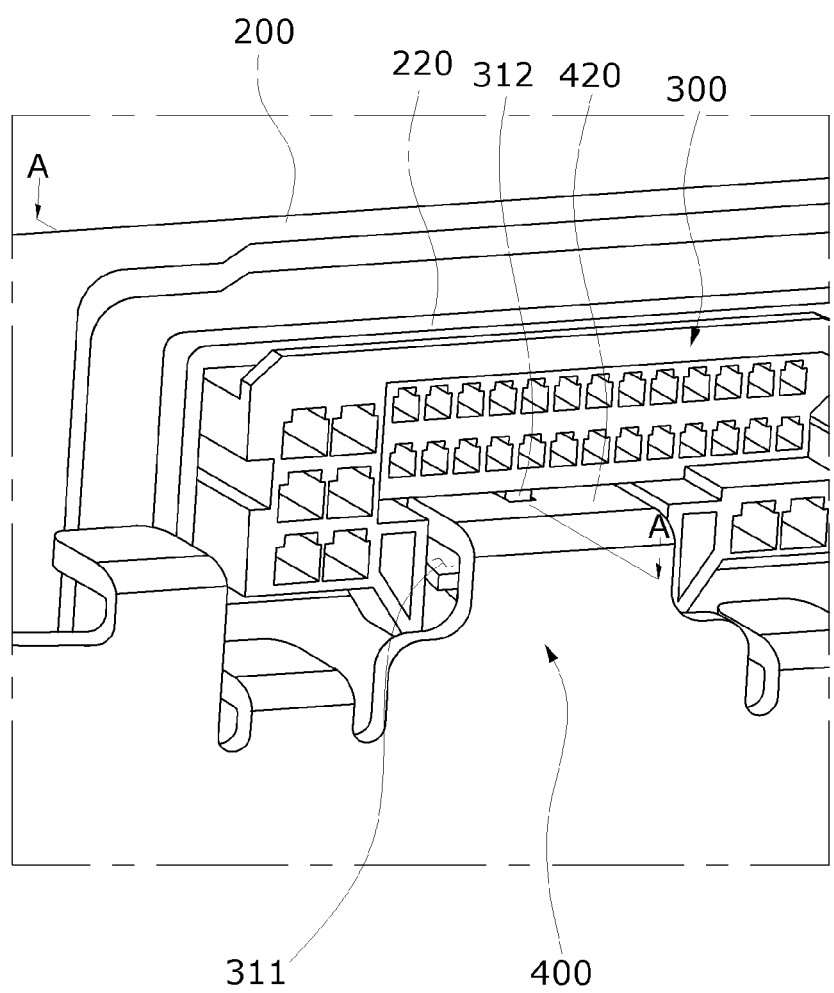
FIG. 4 is a plan view illustrating a state in which the connectors and the safety bracket of an anti-theft structure for an electronic control unit according to the embodiment of the present invention are coupled to each other.
Figure 5:
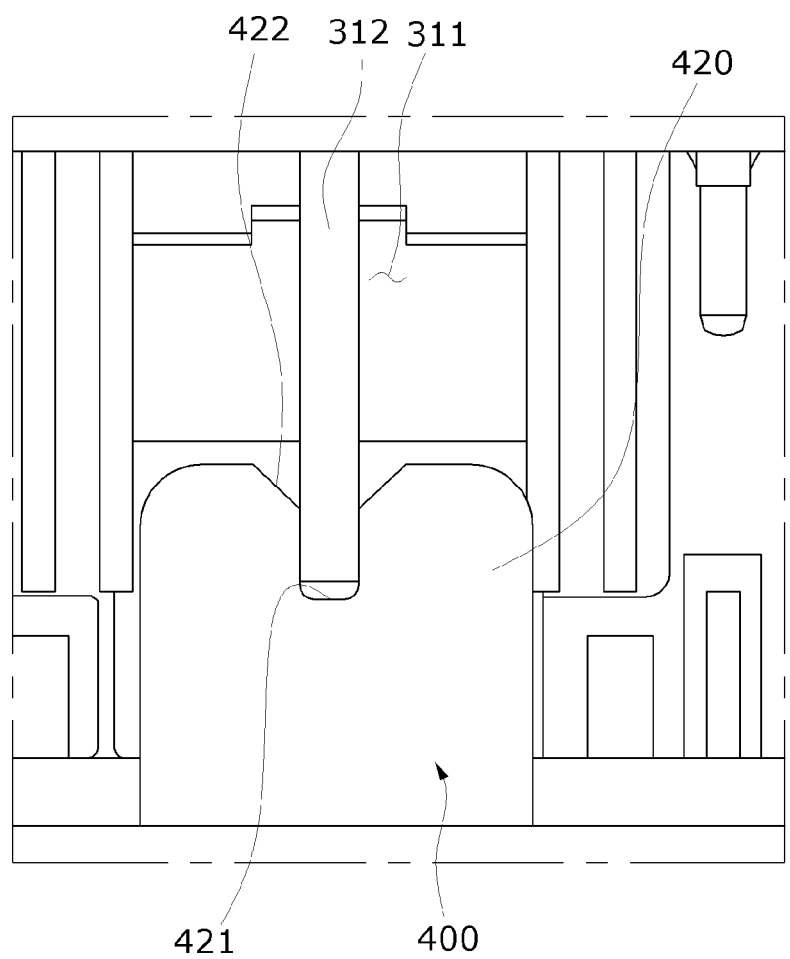
FIG. 5 is a cross-sectional view taken along line A-A of FIG. 4.
Figure 6:
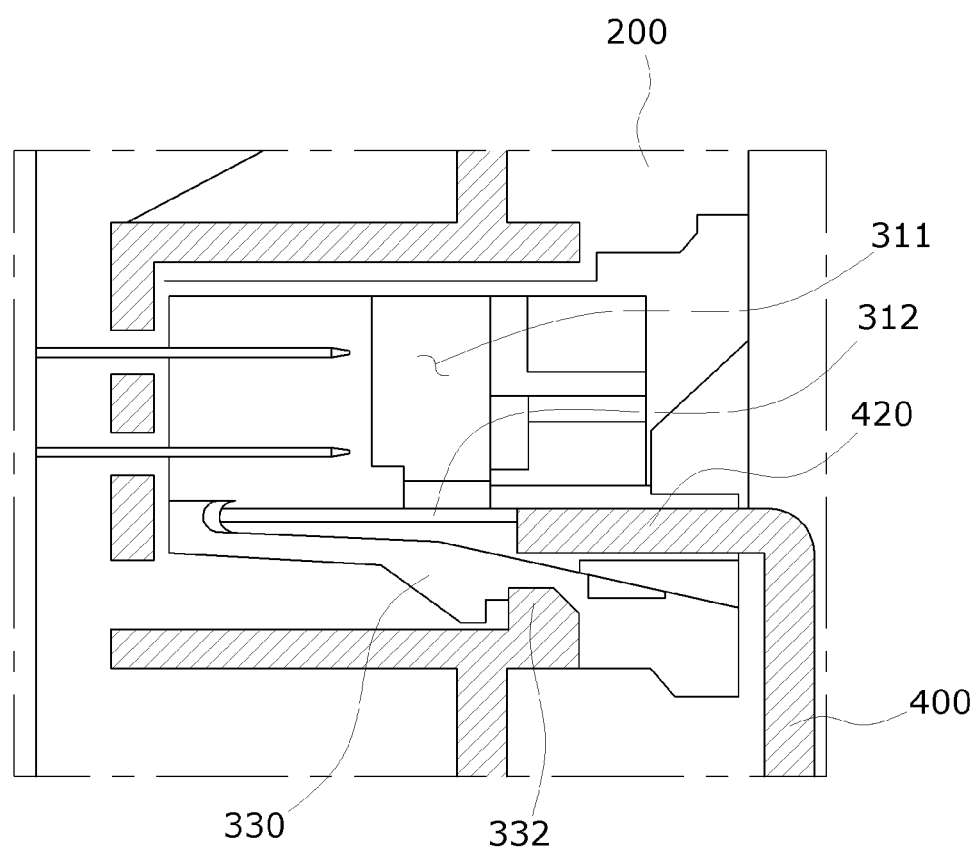
FIG. 6 is a partially enlarged view of a main part of the safety bracket of the anti-theft structure for an electronic control unit of FIGS. 2 and 3 according to the embodiment of the present invention.
Figure 7:
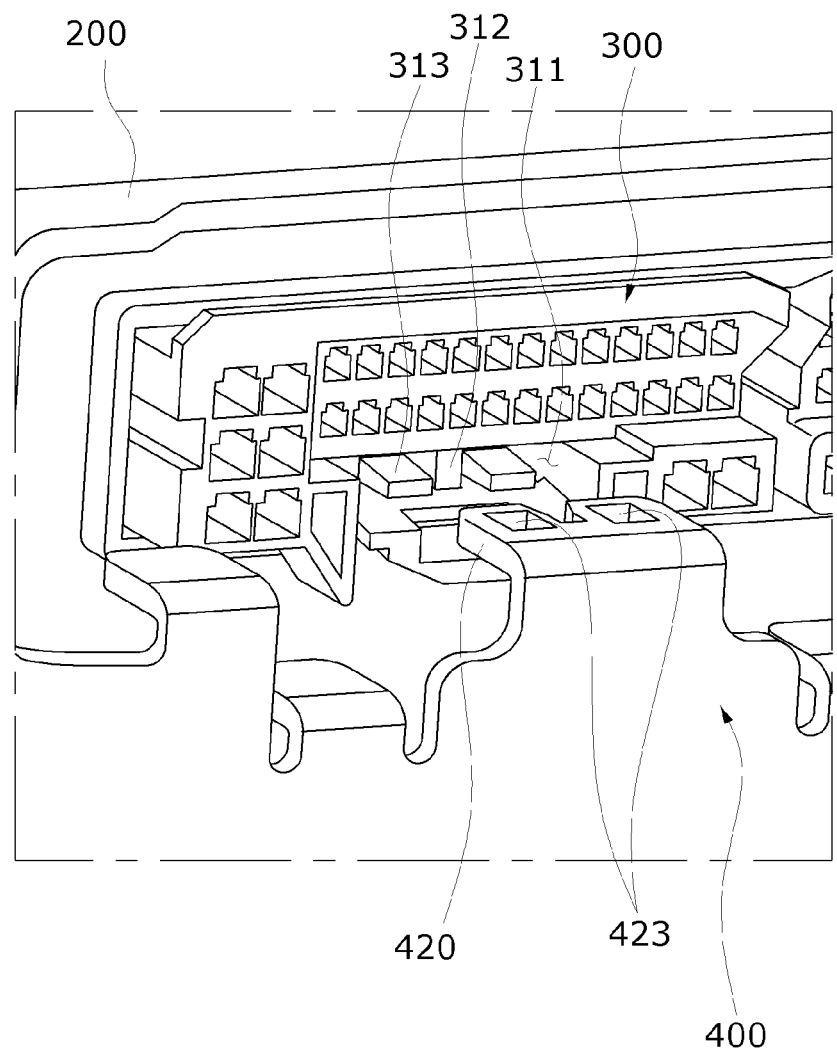
FIG. 7 is a view illustrating a state in which connectors and a safety bracket of an anti-theft structure for an electronic control unit according to another embodiment of the present invention are not coupled to each other.
Figure 8:
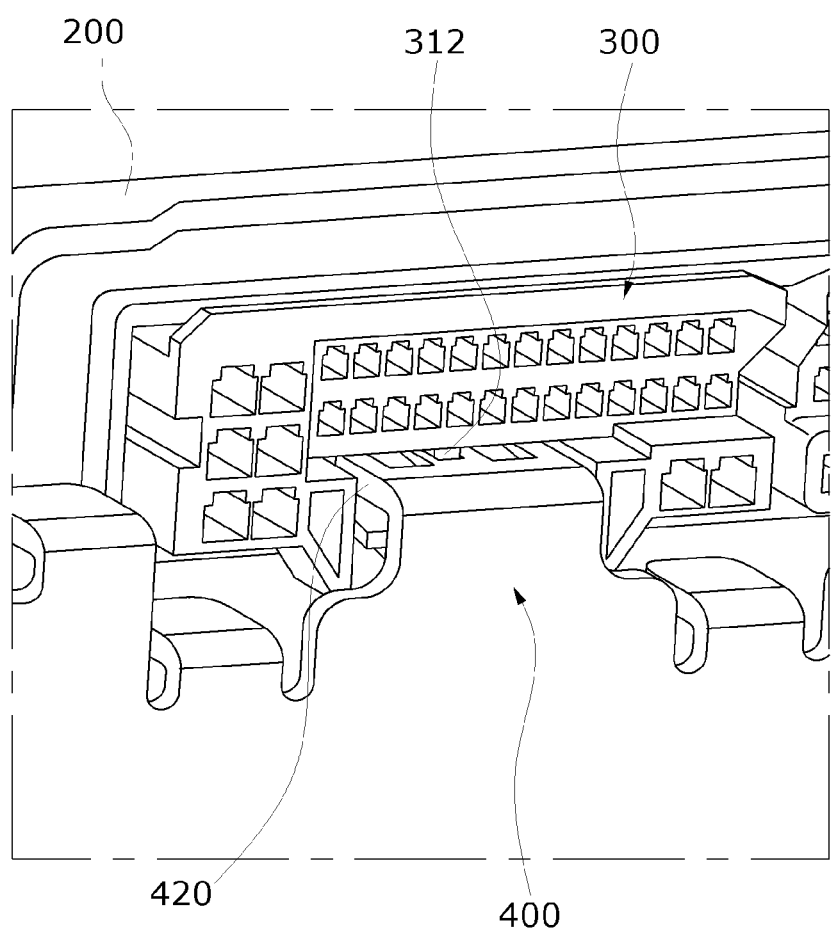
FIG. 8 is a view illustrating a state in which the connectors and the safety bracket of the anti-theft structure for an electronic control unit according to the other embodiment of the present invention are coupled to each other.
Figure 9:
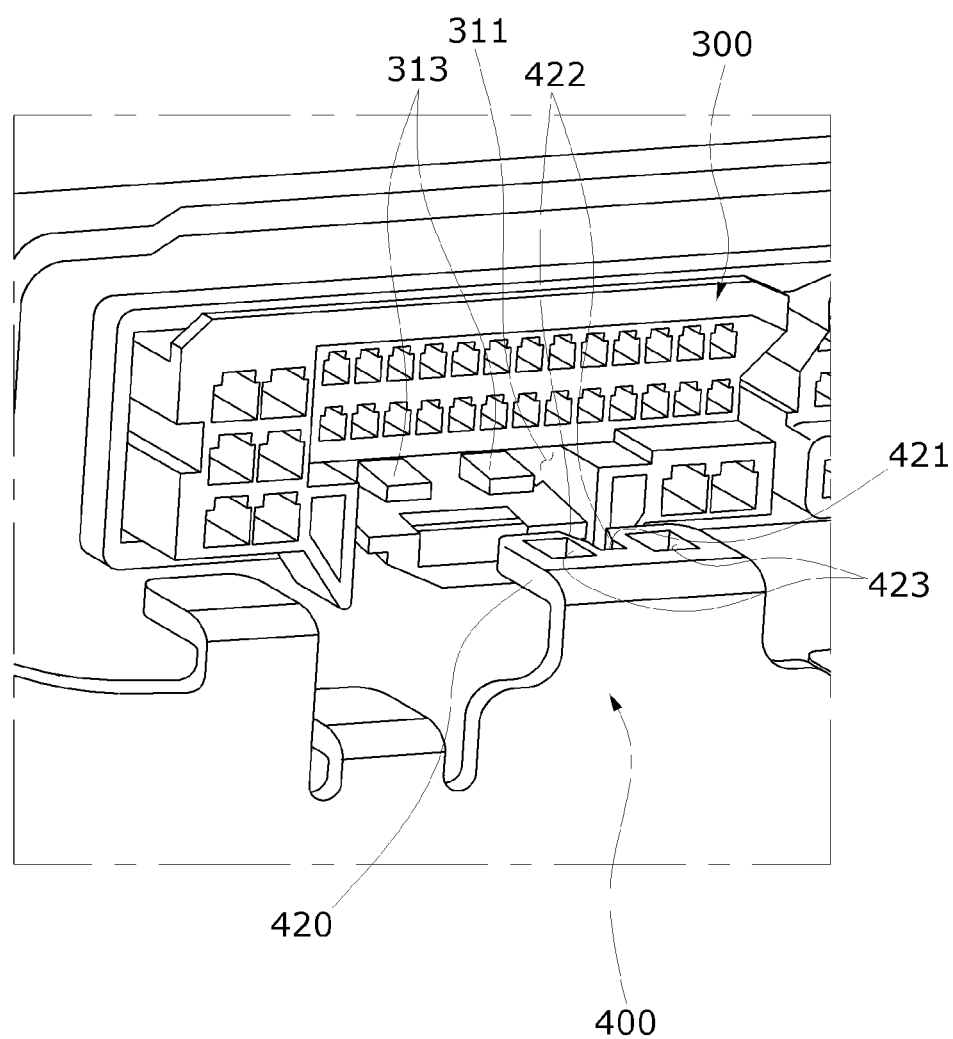
FIG. 9 is an enlarged view of main parts of the connector and the safety bracket of FIGS. 7 and 8 according to the other embodiment of the present invention.

FIG. 1 is a plan view of an anti-theft structure for an electronic control unit according to an embodiment of the present invention, and FIG. 2 is a view illustrating a state in which connectors and a safety bracket of an anti-theft structure for an electronic control unit according to an embodiment of the present invention are not coupled to each other, and FIG. 3 is a view illustrating a state in which the connectors and the safety bracket of the anti-theft structure for an electronic control unit according to the embodiment of the present invention are coupled to each other, and FIG. 4 is a plan view illustrating a state in which the connectors and the safety bracket of an anti-theft structure for an electronic control unit according to the embodiment of the present invention are coupled to each other, and FIG. 5 is a cross-sectional view taken along line A-A of FIG. 4, and FIG. 6 is a partially enlarged view of a main part of the safety bracket of the anti-theft structure for an electronic control unit of FIGS. 2 and 3 according to the embodiment of the present invention, and FIG. 7 is a view illustrating a state in which connectors and a safety bracket of an anti-theft structure for an electronic control unit according to another embodiment of the present invention are not coupled to each other, and FIG. 8 is a view illustrating a state in which the connectors and the safety bracket of the anti-theft structure for an electronic control unit according to the other embodiment of the present invention are coupled to each other, and FIG. 9 is an enlarged view of main parts of the connector and the safety bracket of FIGS. 7 and 8 according to the other embodiment of the present invention.

An anti-theft structure 100 for an electronic control unit according to an embodiment of the present invention includes an electronic control unit 200, a connector 300, and a safety bracket 400.

Here, the anti-theft structure 100 for an electronic control unit is applicable to well-known electronic control units, as well as the electronic control unit 200 illustrated in the drawings.

The electronic control unit 200 has a certain size and performs various functions.

Assembly brackets are mounted on both sides of the electronic control unit 200. Connector mounting grooves 220 are provided at intervals in an upper portion of the electronic control unit 200.

That is, the assembly brackets are provided on both sides of the electronic control unit 200 to be coupled to ends of the safety bracket 400 via bolts.

At least one connector mounting groove 220 is provided at intervals between the assembly brackets, the at least one connector mounting groove 220 being fit-engaged with a bracket coupling portion 420.

Each connector 300 is engaged with one of the at least one connector mounting groove 220 of the electronic control unit 200.

A connector coupling portion 310 is provided in the connector 300 to be engaged with the bracket coupling portion 420 of the safety bracket 400.

The connector 300 is fixedly engaged with the at least one connector mounting groove 220 of the electronic control unit 200 and then fit-engaged with the bracket coupling portion 420 of the safety bracket 400.

Here, a shape of the connector coupling portion 310 may be variously changed according to a shape of the safety bracket 400, and the present invention will be described below with respect to two embodiments of the connector coupling portion 310.

First, in the connector coupling portion 310 illustrated in FIGS. 2 to 6, a coupling space 311 is provided and a connector guide protrusion 312 is vertically provided in the coupling space 311.

Here, it is effective to form a height of the coupling space 311 of the connector coupling portion 310 to correspond to a thickness of the bracket coupling portion 420.

In addition, the coupling space 311 is formed having a height corresponding to the thickness of the bracket coupling portion 420 and is fit-engaged with the bracket coupling portion 420.

In this case, the connector 300 and the safety bracket 400 prevent the electronic control unit 200 from being easily separated by external causes.

Side guide protrusions 313 are provided on both sides of the connector guide protrusion 312 to support side surfaces of the bracket coupling portion 420.

A center of the bracket coupling portion 420 is fixed by the connector guide protrusion 312 of the connector coupling portion 310 when the connector coupling portion 310 is engaged with the bracket coupling portion 420.

In addition, the center and both sides of the bracket coupling portion 420 are double-fixed by the side guide protrusions 313 of the connector coupling portion 310.

A side cross section of a lower support surface 330 of the connector coupling portion 310 is bent. Thus, the lower support surface 330 of the connector coupling portion 310 may be elastically supported by being fit-engaged with the bracket coupling portion 420.

That is, the fit-engaged bracket coupling portion 420 is fixed and supported by the connector coupling portion 310 using the elasticity of the lower support surface 330 separately from the connector guide protrusion 312 and the side guide protrusions 313.

In this case, a support groove 332 is formed in a bottom surface of the lower support surface 330 so that the support groove 332 may be supported by the connector mounting groove 220 when the bracket coupling portion 400 is fit-engaged therewith. An end portion of the bracket coupling portion 400 is chamfered.

Second, a coupling space 311 may be provided in the connector coupling portion 310 and side guide protrusions 313 may be provided on both inner sides of the coupling space 311 as illustrated in FIGS. 7 to 9.

Here, it is effective to form a height of the coupling space 311 of the connector coupling portion 310 to correspond to a thickness of the bracket coupling portion 420.

In addition, the coupling space 311 has the height corresponding to the thickness of the bracket coupling portion 420. Thus, when the bracket coupling portion 420 is fit-engaged with the coupling space 311, the connector 300 and the safety bracket 400 are not easily separated from each other by external causes.

The side guide protrusions 313 are provided on both sides of the connector guide protrusion 312 to support side surfaces of the bracket coupling portion 420.

That is, when the connector coupling portion 310 is engaged with the bracket coupling portion 420, a center of the bracket coupling portion 420 is fixed by the connector guide protrusion 312 of the connector coupling portion 310 and the center and both sides thereof are double-fixed by the side guide protrusions 313.

A side cross section of a lower support surface 330 of the connector coupling portion 310 is bent and thus may be elastically supported after the fit-engaging of the bracket coupling portion 420.

That is, the fit-engaged bracket coupling portion 420 is fixed and supported by the connector coupling portion 310 using the elasticity of the lower support surface 330 separately from the connector guide protrusion 312 and the side guide protrusions 313.

In this case, a support groove 332 is formed in a bottom surface of the lower support surface 330 and thus is supported by the connector mounting groove 220 during the fit-engaging of the bracket coupling portion 400.

A safety bracket 400 is coupled to an electronic control unit 200 and connectors 300.

Side coupling portions 410 are provided on both ends of the safety bracket 400, and at least one bracket coupling portion 420 is provided inside each of the side coupling portions 410.

That is, the side coupling portions 410 on the both ends of the safety bracket 400 are coupled to assembly brackets 210, and the at least one bracket coupling portion 420 is provided on a portion of the safety bracket 400 corresponding to a connector coupling portion 310 to be coupled to the connector coupling portion 310.

Here, the bracket coupling portion 420 of the safety bracket 400 may be variously changed according to circumstances, a purpose, or the like. The present invention will be described with respect to two examples of the bracket coupling portion 420 below.

First, as illustrated in FIGS. 2 to 6, the bracket coupling portion 420 is inserted into a coupling space 311, and a bracket coupling groove 421 is formed in one side of the bracket coupling portion 420 to be fit-engaged with a connector guide protrusion 312 when the bracket coupling portion 420 is inserted into the coupling space 311.

Here, the bracket coupling portion 420 is interference-fitted to a connector coupling portion 310 to be prevented from being easily separated from the connector coupling portion 310 due to an external factor.

The bracket coupling portion 420 is formed such that an end portion 422 of the bracket coupling groove 421 is inclined or curved.

That is, because the end portion 422 is inclined or curved, the bracket coupling portion 420 may be smoothly engaged with the connector guide protrusion 312 of the connector coupling portion 310.

Second, as illustrated in FIGS. 7 to 9, the bracket coupling portion 420 is inserted into the coupling space 311, the bracket coupling groove 421 is formed at a side of the bracket coupling portion 420 to be fit-engaged with the connector guide protrusion 312 when the bracket coupling portion 420 is inserted into the coupling space 311, and bracket coupling holes 423 are formed in both sides of the bracket coupling groove 421 to be fit-engaged with side guide protrusions 313.

Here, the bracket coupling portion 420 is interference-fitted to the connector coupling portion 310 to be prevented from being easily separated from the connector coupling portion 310 due to an external factor.

The bracket coupling portion 420 is formed such that an end portion 422 of the bracket coupling groove 421 is inclined or curved.

That is, because the end portion 422 is inclined or curved, the bracket coupling portion 420 may be smoothly engaged with the connector guide protrusion 312 of the connector coupling portion 310.

An anti-theft structure for an electronic control unit according to an embodiment configured as described above will be described below.

First, the assembly brackets 210 are mounted on both sides of an electronic control unit 200 having a certain size and performing various functions, and connector mounting grooves 220 are formed in an upper portion of the electronic control unit 200 to be spaced apart from each other.

The connectors 300 each including the connector coupling portion 310 are mounted in the connector mounting grooves 220 of the electronic control unit 200. The connector coupling portion 310 is provided with the coupling space 311 therein and the connector guide protrusion 312 formed in the coupling space 311 in a vertical direction.

Next, the electronic control unit 200 equipped with the connectors 300 is installed in a vehicle, and thereafter the safety bracket 400 is mounted on an upper portion of the electronic control unit 200 by engaging the side coupling portions 410 at opposite ends with the assembly brackets 210 and engaging the bracket coupling portions 420, which correspond to the connector coupling portions 310, with the connector coupling portions 310, thereby completing the assembly of the anti-theft structure 100.

Here, an order of assembling the anti-theft structure for an electronic control unit may be different from that described above.

In this state, in the anti-theft structure for an electronic control unit of the present invention, connectors and a safety bracket are double-locked to an electronic control unit to prevent separation of the connectors due to an external factor.

An anti-theft structure for an electronic control unit according to the present invention is coupled to connectors of an electronic control unit by double-locking a safety bracket thereto. Accordingly, it is possible to prevent separation of the connectors due to an external factor and prevent the anti-theft structure from not operating or malfunctioning due to mishandling or assembly errors.

In addition, the anti-theft structure for an electronic control unit according to the present invention is capable of effectively preventing theft, because the connectors and the safety bracket are engaged with each other using a connector guide protrusion or a connector coupling protrusion to prevent separation of the connectors.

The foregoing description is intended to merely provide examples to explain the technical idea of the present invention, and various changes and modifications can be made by those of ordinary skill in the art without departing from the essential characteristics of the present invention.

Therefore, the embodiments of the present invention set forth herein are not provided to limit the scope of the present invention but are provided to explain the scope of the present invention, and the scope of the present invention is not limited by these embodiments. The scope of protection of the present invention should be determined according to the following claims, and all technical ideas which are substantially the same as or equivalent thereto should be construed as being included in the scope of the present invention.

What is claimed is:

1. An anti-theft structure for an electronic control unit, comprising:
    an electronic control unit including assembly brackets mounted on both sides thereof and connector mounting grooves formed in an upper portion thereof to be spaced apart from each other;
    connectors coupled to the connector mounting grooves and comprising connector coupling portions therein; and
    a safety bracket including side coupling portions on both ends of the safety bracket, the side coupling portions being engaged with the assembly brackets, and bracket coupling portions corresponding to the connector coupling portions, the bracket coupling portions being engaged with the connector coupling portions.

2. The anti-theft structure of claim 1, wherein the connector coupling portions comprise coupling spaces therein,
    wherein connector guide protrusions are formed in the coupling spaces in a vertical direction, and
    each of the bracket coupling portions is inserted into one of the coupling spaces and comprises a bracket coupling groove at a side thereof, the bracket coupling groove being fit-engaged with the connector guide protrusions when the bracket coupling portion is inserted into the coupling space.

3. The anti-theft structure of claim 2, wherein the coupling space of the connector coupling portion has a height corresponding to a thickness of the connector coupling portion.

4. The anti-theft structure of claim 2, wherein the bracket coupling portions are interference-fitted to the connector coupling portions.

5. The anti-theft structure of claim 2, wherein an end portion of the bracket coupling groove of the bracket coupling portion is inclined or curved.

6. The anti-theft structure of claim 2, wherein a side cross-section of a lower support surface of the connector coupling portion is bent to elastically support the bracket coupling portion after the interference-fitting of the bracket coupling portion.

7. An anti-theft structure for an electronic control unit, comprising:
    an electronic control unit with a connector mounting groove;
    a connector engaged with the connector mounting groove, wherein the connector comprises:
        a connector coupling portion including a coupling space therein;
        a connector guide protrusion vertically protruding in the coupling space; and
        a side guide protrusion provided near the connector guide protrusion; and
    a safety bracket including a bracket coupling portion fit-engaged with the connector coupling portion,
    wherein the bracket coupling portion comprises:
        a bracket coupling groove fit-engaged with the connector guide protrusion; and
        a bracket coupling hole fit-engaged with the side guide protrusion is inserted and fitted.

8. The anti-theft structure of claim 7, wherein an end portion of the bracket coupling groove of the bracket coupling portion is inclined or curved.

9. The anti-theft structure of claim 7, wherein end portions of the bracket coupling portion are symmetrical to each other with respect to the bracket coupling groove interposed therebetween.

10. An anti-theft structure for an electronic control unit, comprising:
    an electronic control unit with a connector mounting groove;
    a connector engaged with the connector mounting groove, wherein the connector comprises:
        a connector coupling portion including a coupling space therein; and
        a plurality of side guide protrusions provided in the coupling space; and
    a safety bracket including a bracket coupling portion fit-engaged with the connector coupling portion,
    wherein the bracket coupling portion comprises a bracket coupling groove fit-engaged with the plurality of side guide protrusions.

11. The anti-theft structure of claim 10, wherein the connector further comprises a connector guide protrusion protruding vertically between the plurality of side guide protrusions.

12. The anti-theft structure of claim 11, wherein the bracket coupling portion comprises a bracket coupling groove fit-engaged with the connector guide protrusion.

13. The anti-theft structure of claim 12, wherein end portions of the bracket coupling portion are symmetrical to each other with respect to the bracket coupling groove interposed therebetween.

14. The anti-theft structure of claim 13, wherein the end portions of the bracket coupling portion comprise a plurality of bracket coupling holes.

15. The anti-theft structure of claim 13, wherein the end portions of the bracket coupling portion are chamfered.

16. The anti-theft structure of claim 11, wherein the connector guide protrusion is spaced apart from the plurality of side guide protrusions.

\* \* \* \* \*